United States Patent
Ehinger et al.

(10) Patent No.: US 10,969,001 B2
(45) Date of Patent: Apr. 6, 2021

(54) PLANET GEAR HAVING FAILURE MODE OPTIMIZED FOR CONTINUED PLANETARY GEAR SYSTEM OPERATION

(71) Applicant: Bell Helicopter Textron Inc., Fort Worth, TX (US)

(72) Inventors: Ryan Thomas Ehinger, Southlake, TX (US); Ron Woods, Weatherford, TX (US)

(73) Assignee: Textron Innovations Inc.

( * ) Notice: Subject to any disclaimer, the term of this patent is extended or adjusted under 35 U.S.C. 154(b) by 159 days.

(21) Appl. No.: 15/656,487

(22) Filed: Jul. 21, 2017

(65) Prior Publication Data

US 2019/0024780 A1 Jan. 24, 2019

(51) Int. Cl.
| | | |
|---|---|---|
| *F16H 57/08* | (2006.01) | |
| *F16H 55/08* | (2006.01) | |
| *F16H 1/28* | (2006.01) | |
| *G01M 13/021* | (2019.01) | |
| *F16H 57/00* | (2012.01) | |

(52) U.S. Cl.
CPC ............... *F16H 57/08* (2013.01); *F16H 1/28* (2013.01); *F16H 55/08* (2013.01); *G01M 13/021* (2013.01); *F16H 2057/0087* (2013.01)

(58) Field of Classification Search
CPC ... F16H 57/08; F16H 2057/0087; F16H 55/08
See application file for complete search history.

(56) References Cited

U.S. PATENT DOCUMENTS

2003/0123984 A1* 7/2003 Wilde .................... F16C 19/54
416/170 R
2007/0078038 A1 4/2007 Ando et al.

FOREIGN PATENT DOCUMENTS

| CN | 205479290 U | 8/2016 |
|---|---|---|
| WO | 2006070245 A2 | 7/2006 |

OTHER PUBLICATIONS

Cura et al., "Crack propagation behavior in planet gears"; 21st European Conference on Fracture, ECF21; pp. 3610-3616; Jun. 20-24, 2016 (Year: 2016).*
European Exam Report in related European Patent Application No. 17186844.1, dated Jun. 19, 2018, 7 pages.
European Exam Report in related European Patent Application No. 17186844.1, dated Jun. 21, 2019, 6 pages.
Canadian Exam Report in related Canadian Patent Application No. 3,012,147 dated Aug. 14, 2019, 6 pages.
"Electric Bikes—wear, tear and repair—Bafang CST Hub Motor strip down" made public on Apr. 11, 2016; URL: http://www.signsofsuccess.co.nz/electric-bikes-wear-tear-and-repair/.
European Exam Report in related European Patent Application No. 17186844.1, dated Dec. 12, 2018, 6 pages.
Lewicki, David G., "Gear Crack Propagation Studies—Guidelines for Ultra-Safe Design"; U.S. Army Research Laboratory, Glenn Research Center, Cleveland, Ohio; NASA/TM—2001-211073; Jul. 2001; 16 pages.

(Continued)

*Primary Examiner* — Erin D Bishop
(74) *Attorney, Agent, or Firm* — Lightfoot & Alford PLLC

(57) ABSTRACT

A method of optimizing a planetary gear system for continued operation after failure of a planet gear includes providing a planetary gear system and reducing a backup ratio of a planet gear of the planetary gear system by reducing a rim thickness of the planet gear.

7 Claims, 5 Drawing Sheets

(56) References Cited

OTHER PUBLICATIONS

European Search Report in related European Patent Application No. 17186844.1, dated May 30, 2018, 5 pages.
European Exam Report in related European Patent Application No. 17186844.1, dated Dec. 16, 2019, 6 pages.
Canadian Exam Report in related Canadian Patent Application No. 3,012,147 dated Mar. 9, 2020, 4 pages.
European Exam Report in related European Patent Application No. 17186844.1 dated Aug. 10, 2020, 5 pages.
European Exam Report in related European Patent Application No. 17186844.1 dated Feb. 3, 2021, 6 pages.
Ishida, et al., "Stress of Planet Gears with Thin Rims", Gear Technology, Aoril 30, 1994, pp. 26-31, XP055769937, Retrieved from the Internet: URL: https://www.geartechnology.com/issues/0394x/ishida.pdf [retrieved on Jan. 28, 2021].

* cited by examiner

PLANET GEAR HAVING FAILURE MODE OPTIMIZED FOR CONTINUED PLANETARY GEAR SYSTEM OPERATION

BACKGROUND

In planetary gear systems, a planet gear or a pinion gear is typically designed to fail by gear tooth breakage. In cases where a planet gear tooth breaks off from the planet gear, the planetary gear system can experience a catastrophic failure when the broken tooth remnants become enmeshed between planet gears and the sun gear and/or between the planet gears and the ring gear. This failure mode can cause the planet teeth or pinion teeth to catastrophically lock up due to interference with the mating teeth of the sun gear or ring gear. While a catastrophic failure of a planetary gear system in some applications may be an expensive inconvenience, such a failure in an aircraft propulsion system, such as, but not limited to, the propulsion system of a helicopter, can lead to fatal crashes and/or significant damage to the aircraft. Despite these concerns, some studies nonetheless champion the promotion of planet gear tooth breakage as a preferred, primary, and desired failure mode of the planet gears.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
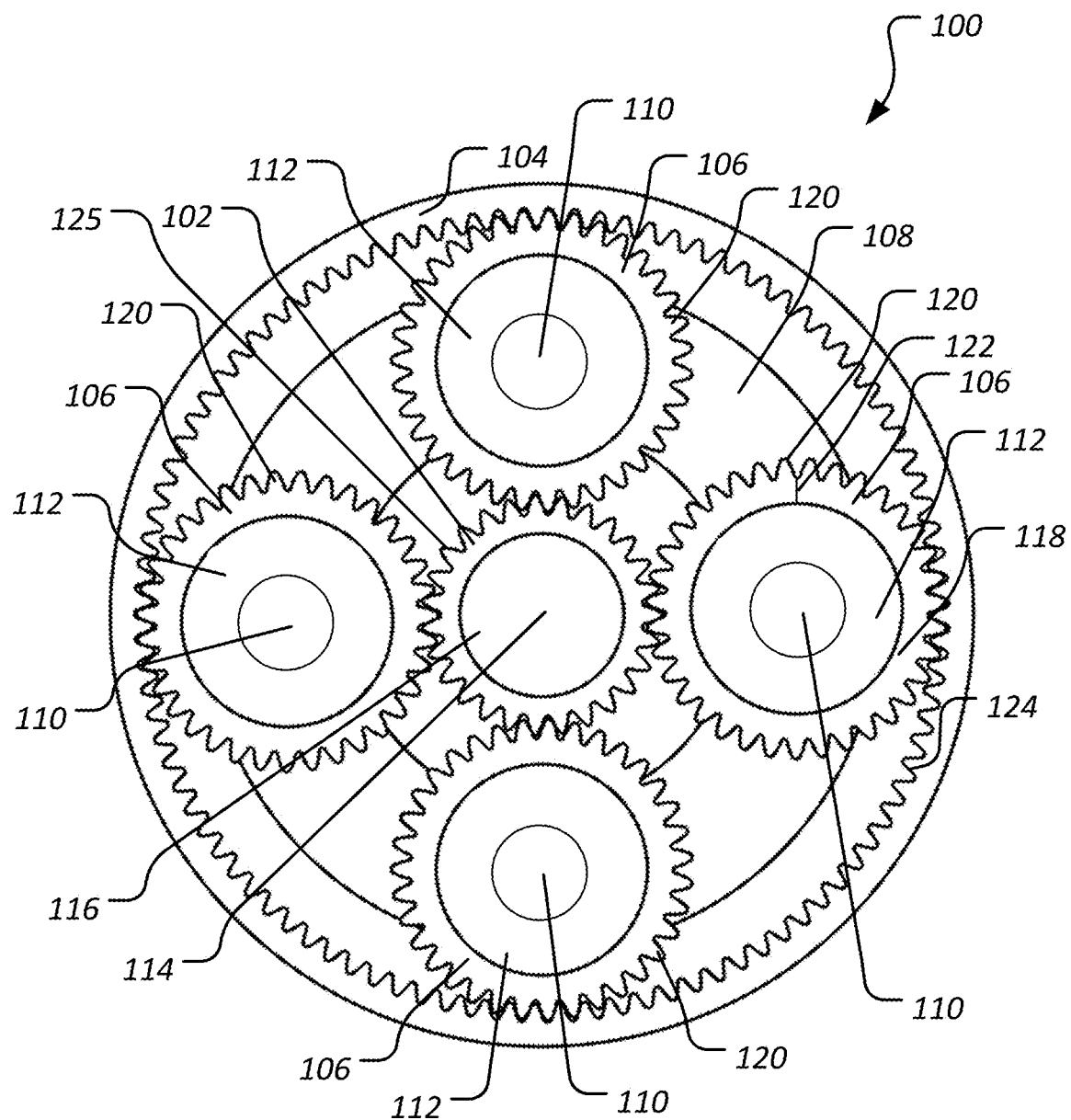
FIG. 1 is an orthogonal top view of a planetary gear system according to an embodiment of this disclosure.

Referring now to FIG. 1, a planetary gear system 100 of the present disclosure is shown. The planetary gear system 100 comprises a sun gear 102, a ring gear 104, and four planet gears 106 (or pinion gears). The four planet gears 106 are carried by a carrier 108. More specifically, the planet gears 106 are rotatably mounted to posts 110 of the carrier 108 using roller bearings 112. Although the planetary gear system 100 can be driven in multiple ways by restricting angular rotation of any one of the sun gear 102, ring gear 104, and the carrier 108, operation of the planetary gear system 100 is described herein for illustration purposes as allowing angular rotation of the sun gear 102 and the carrier 108 about a central axis 114 of a shaft 116 to which the sun gear 102 is mounted. Most generally, with the carrier 108 prevented from rotating about the central axis 114, a clockwise rotation of the shaft 116 and associated sun gear 102 results in the counter-clockwise rotation of the planet gears 106 and clockwise rotation of the carrier 108. In this embodiment, each of the sun gear 102, the ring gear 104, and the planet gears 106 are formed as involute gears so that, when functioning under normal operating conditions and without failure of any of the gears, contact between two gear teeth occurs along a single line of action (or pressure line or line of contact). While conventional planetary gear systems are designed with a preference toward breaking teeth off planet gears as a primary mode of failure, the planetary gear system 100 is designed to accommodate a break 122 in a rim 118 of a planet gear 106. The rims 118 can most generally be described as comprising the material of the planet gears 106 that exists radially inward (toward the associated posts 110) from the root circle (comprising a root diameter) of the planet gears 106. More generally, the rims 118 comprise the material of the planet gears 106 that carry planet gear teeth 120.

Still referring to FIG. 1, the planetary gear system 100 is shown with a break 122 (or a through crack). When the planetary gear system 100 operates as described with respect to FIG. 1, the break 122 rotates counter-clockwise about the associated post 110. When the break 122 has passed engagement of the teeth of the sun gear 102 and is approaching the ring gear 104, the ends of the broken rim 118 are in compression so that the broken planet gear 106 generally behaves normally and is not significantly distorted or out of round. However, when the break 122 has passed engagement with the teeth of the ring gear 104 and is approaching the sun gear 102, the forces applied to the broken planet gear 106 by the sun gear 102 and the ring gear 104 tend to separate the ends of the broken rim 118. As a function of the separation, the rim 118 is forced out of round so that the portion of the rim 118 from the break 122 to the interface between the broken planet gear 106 and the ring gear 104 is distorted and may be partially elastically unfurled and/or partially straightened relative to the original circular shape of the rim 118. Even though the unfurling may only be temporary due to the at least partially elastic nature of the bending, the unfurling may alter the meshing characteristics of the planet gear 106 relative to the ring gear 104. While high contact ratio planetary gear systems with relatively longer teeth may experience binding or tooth interference between the broken planet gear 106 and the ring gear 104 or the sun gear 102, the planetary gear system 100 of the present disclosure is designed so that the unfurling is anticipated and accommodated in the size and shape of the planet gear teeth 120 and/or the ring gear teeth 124 of the ring gear 104 and/or the sun gear teeth 125. In order to provide a planet gear 106 failure mode, such as rim 118 break 122 rather than breaking off a planet gear tooth 120, the planet gears 106 are purposefully designed and optimized to more probably fail by rim 118 breakage as opposed to planet gear tooth 120 fracture. Accordingly, at least in part because the planet gears 106 do not shed planet gear teeth 120 into the planetary gear system 100, an at least temporarily benign failure mode of the planet gears 106 and associated planetary gear system 100 can be obtained.

Figure 2:
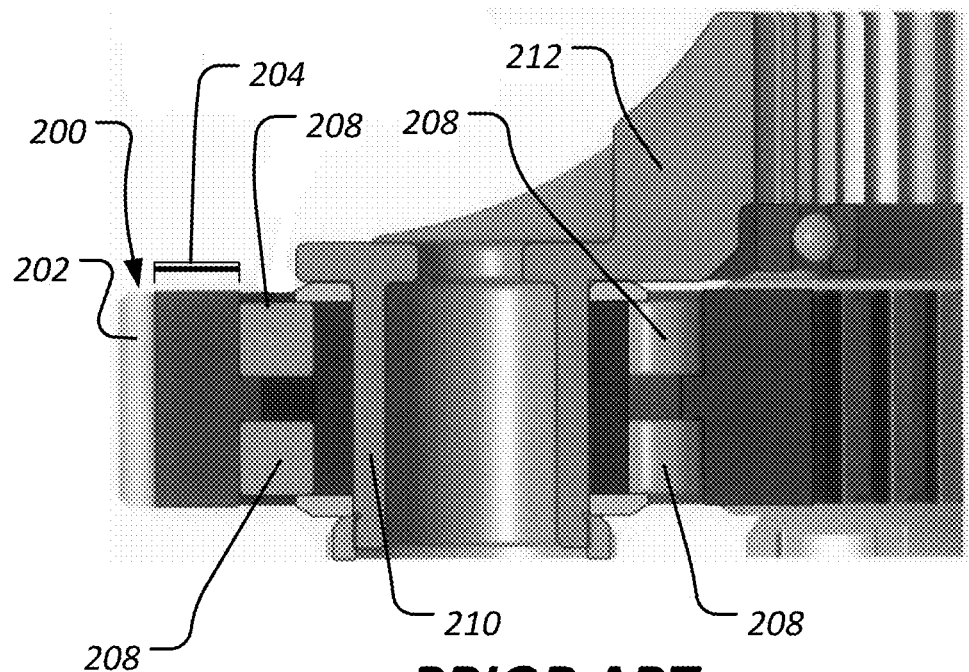
FIG. 2 is a cutaway view of a conventional planet gear.

Providing planetary gear system 100 with the above-described planet gears 106 configured to ensure formation of a break 122 rather than planet gear tooth 120 breakage can be accomplished in a variety of ways. Referring now to FIG. 2, a cutaway view of a conventional planet gear 200 is shown. The planet gear 200 is generally designed to comprise a primary failure mode of planet gear tooth 202 breakage. However, as described above, the resultant potentially destructive result of casting planet gear tooth 202 fragments into the remainder of a planetary gear system is highly undesirable. More specifically, in the conventional embodiment shown in FIG. 2, the planet gear 200 comprises a rim thickness 204 and a planet gear tooth 202 depth 206. In this embodiment, the planet gear 200 comprises a backup ratio of 2.0 (calculated as rim thickness 204 divided by planet gear tooth 202 depth 206). In this embodiment, the planet gear 200 is associated with roller bearings 208 comprising an 11 millimeter diameter and an 11 millimeter length. The roller bearings 208 assist with allowing rotation of the planet gear 200 about a post 210 of a carrier 212.

Figure 3:
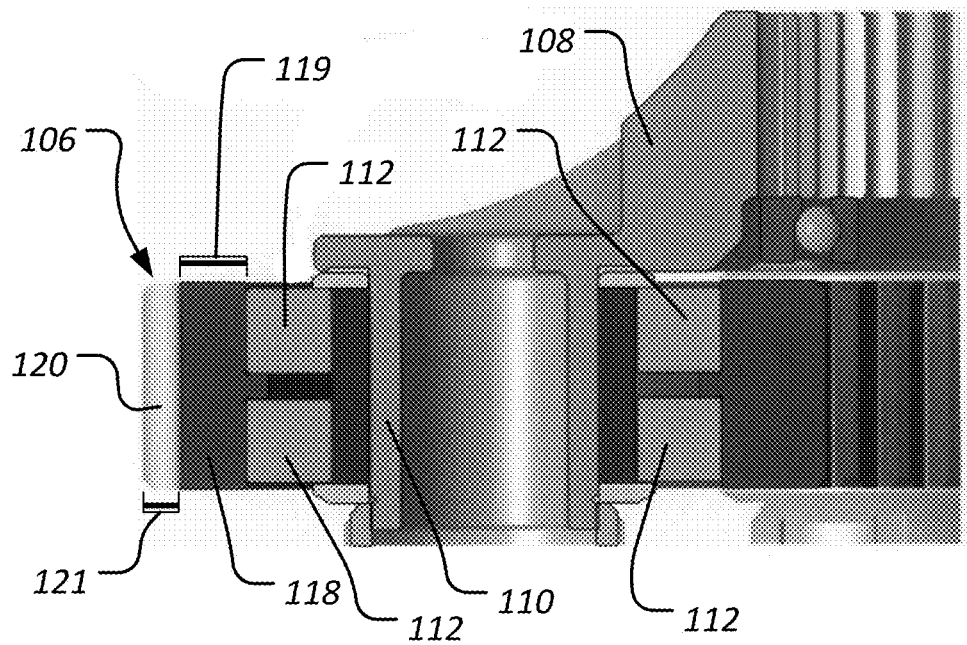
FIG. 3 is a cutaway view of a planet gear of the present disclosure.

Referring now to FIG. 3, a cutaway view of planet gear 106 according to the present disclosure is shown. Planet gear 106 is substantially similar to planet gear 200, however, planet gear 106 has been optimized to promote rim 118 cracking and/or breakage rather than planet gear 106 tooth 120 breakage. More specifically, the planet gear 106 has been optimized relative to the conventional planet gear 200 by reducing the backup ratio of the planet gear 106 relative to the backup ratio of the conventional planet gear 200. In this embodiment, the backup ratio of the planet gear is 1.65 (calculated as rim thickness 119 divided by planet gear 106 tooth 120 depth 121). In addition to preventing tooth 120 breakage or at least reducing a probability of tooth 120 breakage prior to formation of a break 122, the reduction in thickness of the rim 118 can provide an opportunity for larger bearings 112 without increasing an overall diameter of the planet gear 106. In other words, by thinning the rim 118 and substantially holding other planetary gear system 100 dimensions constant (but for bearing 112 size), FIG. 3 demonstrates that a conventional planet gear can be optimized to both promote rim cracking and/or breakage rather than planet gear tooth breakage. In this embodiment, the optimization (reduced rim 118 thickness 119) allows for relatively larger roller bearings 112 comprising a 13 millimeter diameter and a 13 millimeter length. In some alternative embodiments, a planet gear may be optimized by providing a rim thickness equal to about 0.5 to about 1.2 times the tooth depth so that a majority of root cracks propagate through the rim 118 to form a break 122. In alternative embodiments, a planet gear can be optimized to promote rim cracking by reducing the backup ratio as a function of increasing a tooth depth while maintaining an existing rim thickness. Still further, in other embodiments, a planet gear can be optimized to promote rim cracking by both increasing a tooth depth and reducing a rim thickness.

Figure 4:
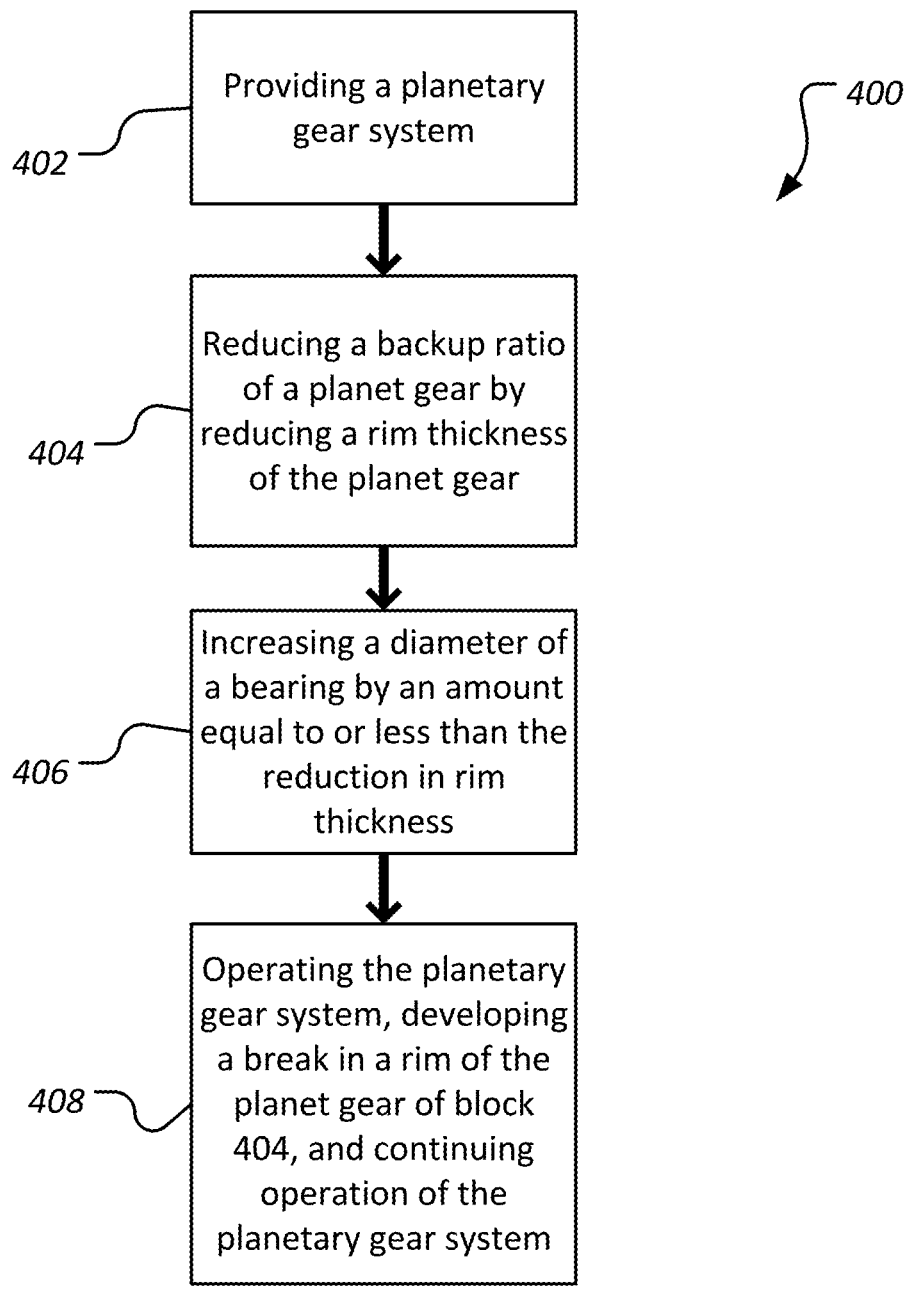
FIG. 4 is a flowchart of a method of optimizing a planetary gear system for continued operation after failure of a planet gear.

Referring now to FIG. 4, a flowchart of a method 400 of optimizing a planetary gear system for continued operation after failure of a planet gear is shown. The method 400 may begin at block 402 by providing a planetary gear system. In some cases, the providing the planetary gear system may comprise providing an initially conventionally designed planetary gear system comprising planet gears designed to fail by tooth breakage. The method 400 may continue at block 404 by reducing a backup ratio of a planet gear by reducing a rim thickness of the planet gear. In some cases, the conventional planet gear can be supplanted by a planet gear comprising the desired reduced backup ratio while in other cases, an existing conventional planet gear may be machined to reduce the thickness of the planet gear rim. In cases where an existing planetary gear system design is to be optimized, it can be advantageous to increase a size of a bearing to account for the space created by the reduction in planet gear rim thickness. Accordingly, the method 400 can continue at block 406 by increasing a diameter of a bearing by an amount equal to or less than the reduction in planet gear rim thickness accomplished at block 404. In some cases, the method 400 may continue at block 408 by operating the planetary gear system, developing a break in a rim of the planet gear of block 404, and continuing operation of the planetary gear system. In some cases, the continuing operation of the planetary gear system may comprise the above-described at least partial unfurling of the rim of the planet gear of block 404.

Figure 5:
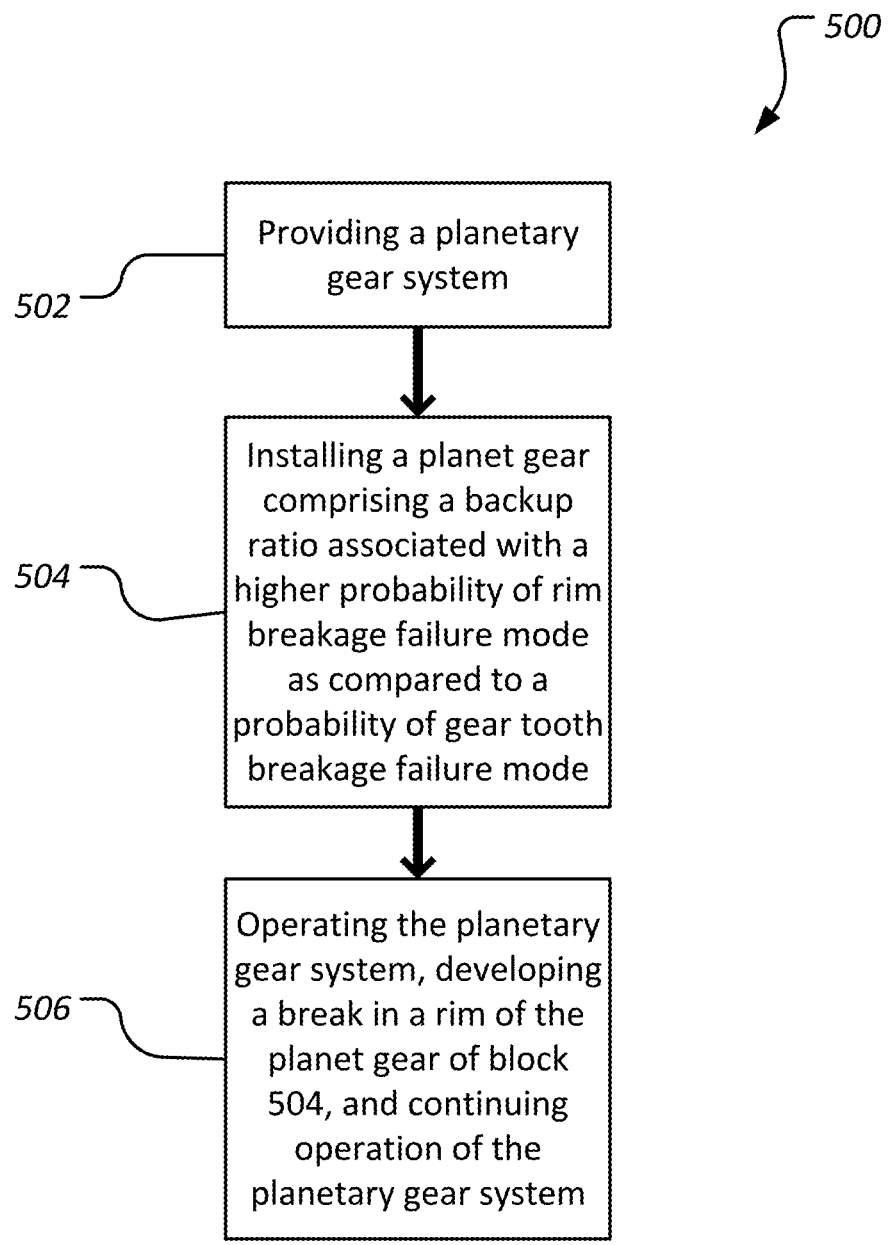
FIG. 5 is a flowchart of another method of optimizing a planetary gear system for continued operation after failure of a planet gear.

Referring now to FIG. 5, another method of optimizing a planetary gear system for continued operation after failure of a planet gear is shown. The method 500 may begin at block 502 by providing a planetary gear system. In some cases, the providing the planetary gear system may comprise providing an initially conventionally designed planetary gear system comprising planet gears designed to fail by tooth breakage. The method 500 may continue at block 504 by installing a planet gear comprising a backup ratio associated with a higher probability of rim breakage failure mode as compared to a probability of gear tooth breakage failure mode. In some embodiments, this may comprise installing a planet gear comprising a rim thickness of about 0.5 to about 1.2 times the tooth depth of the planet gear. In some cases, the method 500 may continue at block 506 by operating the planetary gear system, developing a break in a rim of the planet gear of block 504, and continuing operation of the planetary gear system. In some cases, the continuing operation of the planetary gear system may comprise the above-described at least partial unfurling of the rim of the planet gear of block 504.

Figure 6:
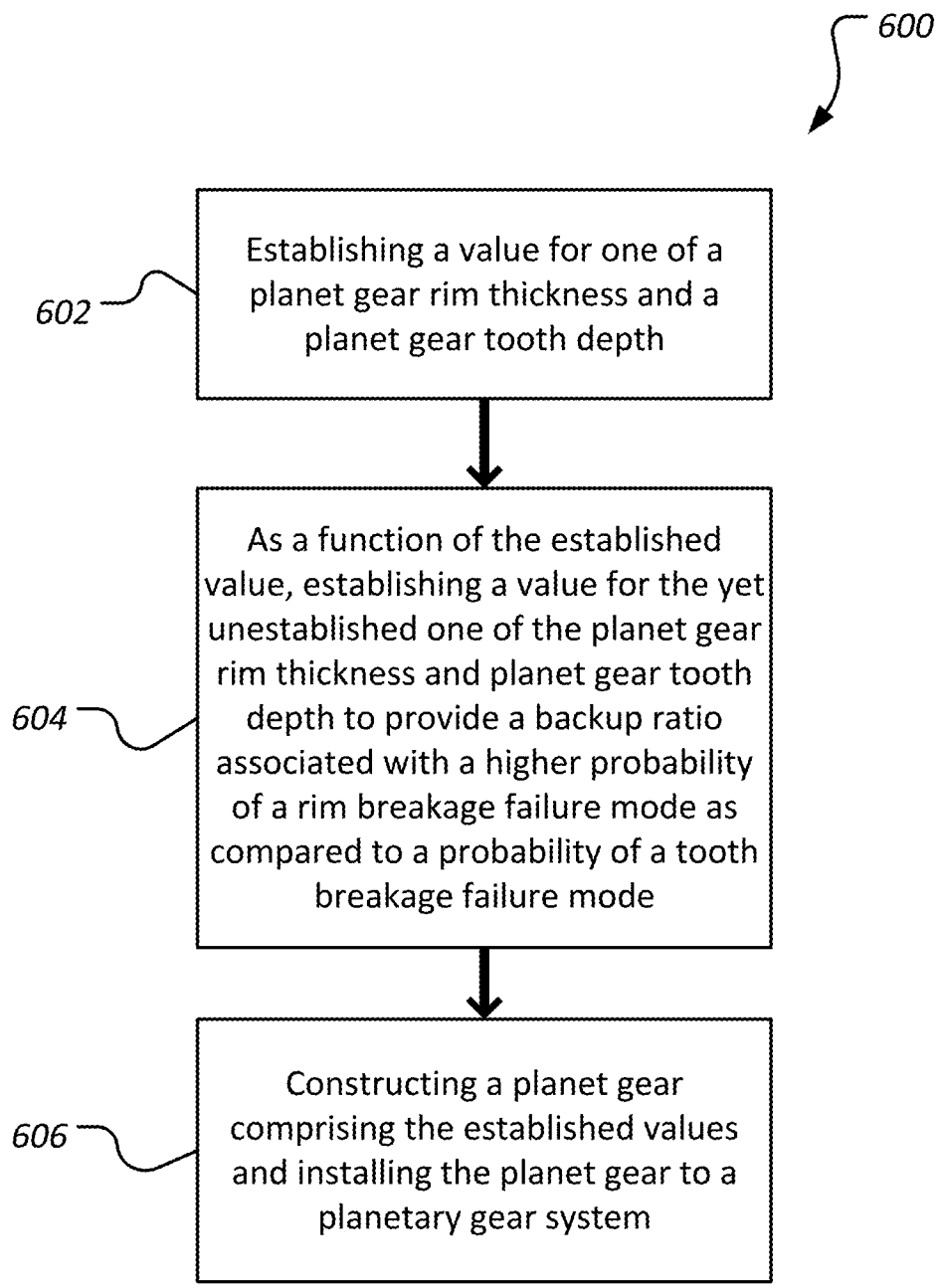
FIG. 6 is a flowchart of a method of optimizing a planet gear for rim breakage rather than tooth breakage.

Referring now to FIG. 6, a flowchart of a method 600 of designing a planet gear optimized for a rim breakage failure mode is shown. The method 600 may begin at block 602 by establishing a value for either a planet gear rim thickness or a planet gear tooth depth. Next, the method 600 can continue at block 604 by, as a function of the value established at block 602, establishing a value for the yet unestablished one of the planet gear rim thickness and planet gear tooth depth to provide a backup ratio associated with a higher probability of a rim breakage failure mode as compared to a probability of a tooth breakage failure mode. In some embodiments, the method may continue at block 606 by constructing a planet gear comprising the established values and installing the planet gear to a planetary gear system.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of designing a planet gear optimized for a rim breakage failure mode, comprising:
   establishing a value for one of a planet gear rim thickness and a planet gear tooth depth; and
   as a function of the established value, establishing a value for the yet unestablished one of the planet gear rim thickness and planet gear tooth depth to provide a backup ratio associated with a higher probability of a rim breakage failure mode as compared to a probability of a gear tooth breakage failure mode.

2. The method of claim 1, further comprising:
   constructing the planet gear comprising the established values.

3. The method of claim 2, further comprising:
   installing the planet gear to a planetary gear system.

4. The method of claim 3, further comprising:
   operating the planetary gear system.

5. The method of claim 4, further comprising:
   developing a break in a rim of the planet gear.

6. The method of claim 5, further comprising:
   continuing operation of the planetary gear system while the planet gear rim is broken.

7. The method of claim 6, wherein the continued operation of the planetary gear system comprises an at least partial unfurling of the rim of the planet gear.

* * * * *